US009781385B2

(12) United States Patent
Ma et al.

(10) Patent No.: US 9,781,385 B2
(45) Date of Patent: Oct. 3, 2017

(54) USER INTERFACES FOR PRESENTATION OF AUDIO/VIDEO STREAMS

(71) Applicant: Blue Jeans Network, Mountain View, CA (US)

(72) Inventors: Luke Ma, Santa Clara, CA (US); Benjamin J. Hutchison, Mountan View, CA (US); Umesh S. Chandak, Sunnyvale, CA (US)

(73) Assignee: BLUE JEANS NETWORK, Mountain View, CA (US)

( * ) Notice: Subject to any disclaimer, the term of this patent is extended or adjusted under 35 U.S.C. 154(b) by 649 days.

(21) Appl. No.: 14/216,432

(22) Filed: Mar. 17, 2014

(65) Prior Publication Data
US 2014/0317532 A1 Oct. 23, 2014

Related U.S. Application Data

(60) Provisional application No. 61/798,963, filed on Mar. 15, 2013, provisional application No. 61/803,331, filed on Mar. 19, 2013.

(51) Int. Cl.
G06F 3/00 (2006.01)
H04N 7/15 (2006.01)
G06F 9/44 (2006.01)

(52) U.S. Cl.
CPC ........... H04N 7/152 (2013.01); G06F 9/4443 (2013.01)

(58) Field of Classification Search
CPC ........ G06Q 10/10; G06F 3/0481; H04N 7/15; H04N 7/147

USPC ............... 715/711, 753; 348/14.08
See application file for complete search history.

(56) References Cited

U.S. PATENT DOCUMENTS

| 8,482,593 | B2 | 7/2013 | Periyannan et al. |
| 8,514,263 | B2 | 8/2013 | Periyannan et al. |
| 8,875,031 | B2 | 10/2014 | Periyannan et al. |
| 8,885,013 | B2 | 11/2014 | Periyannan et al. |

(Continued)

Primary Examiner — Haoshian Shih
(74) Attorney, Agent, or Firm — Ascenda Law Group, PC

(57) ABSTRACT

Embodiments are described for a user interface presenting audio and/or video streams. In some embodiments, a request to increase a size of a first user interface element from a plurality of user interface elements displayed within a user interface on a display is received from a video conference participant's device, at least one numerical representation for dimensions of the user interface display area for each of a plurality of potential layouts for at least a portion of the plurality of user interface elements is calculated to satisfy the request, a video conference system determines a new layout from the one or more potential layouts to accommodate the request by performing at least one comparison between a numerical representation for a potential layout and each remaining numerical representation for a potential layout from the plurality, the new layout comprising at least one of a video quality adjustment of one or more user interface elements, a rearrangement of one or more user interface elements into different sizes and positions, and an elimination of a user interface element from the user interface, and a media server for the video conference apportions bandwidth for one or more video data streams from the composite in accordance with the new layout to be received by the video conference participant's device.

20 Claims, 6 Drawing Sheets

(56) References Cited

U.S. PATENT DOCUMENTS

| | | |
|---|---|---|
| 9,035,997 B2 | 5/2015 | Periyannan et al. |
| 9,041,765 B2 | 5/2015 | Periyannan et al. |
| 9,124,757 B2 | 9/2015 | Weber |
| 9,143,729 B2 | 9/2015 | Anand et al. |
| 9,232,191 B2 | 1/2016 | Periyannan et al. |
| 2003/0085998 A1* | 5/2003 | Ramirez-Diaz .... G08B 13/1961 348/143 |
| 2005/0099492 A1* | 5/2005 | Orr .................... H04L 12/1827 348/14.08 |
| 2013/0151963 A1* | 6/2013 | Costenaro ............ G06F 3/0481 715/711 |
| 2014/0092203 A1 | 4/2014 | Periyannan et al. |
| 2014/0313278 A1 | 10/2014 | Periyannan et al. |

\* cited by examiner

USER INTERFACES FOR PRESENTATION OF AUDIO/VIDEO STREAMS

CROSS REFERENCE TO RELATED APPLICATIONS

This application is a NONPROVISIONAL of, claims priority to, and incorporates by reference in its entirety U.S. Provisional Application No. 61/798,963, entitled "System and Service for Providing Video Conferencing That Provides One Click to Join Into Calls," filed on Mar. 15, 2013 and U.S. Provisional Application No. 61/803,331, entitled "System and service for providing video conferencing that provides an improved method of displaying audio/video streams," filed on Mar. 19, 2013.

FIELD OF THE INVENTION

The present invention is directed to displaying audio and/or visual data streams in a user interface.

BACKGROUND

In any display surface in video conferencing, there can be an arbitrary number of things to be displayed, which in this case are video streams. The conventional approach has been to provide a set and static way of displaying. Users can interact with this type of system through any number of control mechanisms. However, these mechanisms are cumbersome and have limited flexibility and reactivity.

SUMMARY

Embodiments are described for a user interface presenting audio and/or video streams. In some embodiments, a request to increase a size of a first user interface element from a plurality of user interface elements displayed within a user interface on a display is received from a video conference participant's device, where each of the user interface elements from the plurality presents at least one video data stream from a composite of video streams is received by the video conference participant's device, at least one numerical representation for dimensions of the user interface display area for each of a plurality of potential layouts for at least a portion of the plurality of user interface elements is calculated to satisfy the request, a video conference system determines a new layout from the one or more potential layouts to accommodate the request by performing at least one comparison between a numerical representation for a potential layout and each remaining numerical representation for a potential layout from the plurality, the new layout comprising at least one of a video quality adjustment of one or more user interface elements, a rearrangement of one or more user interface elements into different sizes and positions, and an elimination of a user interface element from the user interface, and a media server for the video conference apportions bandwidth for one or more video data streams from the composite in accordance with the new layout to be received by the video conference participant's device.

DETAILED DESCRIPTION

Figure 1:
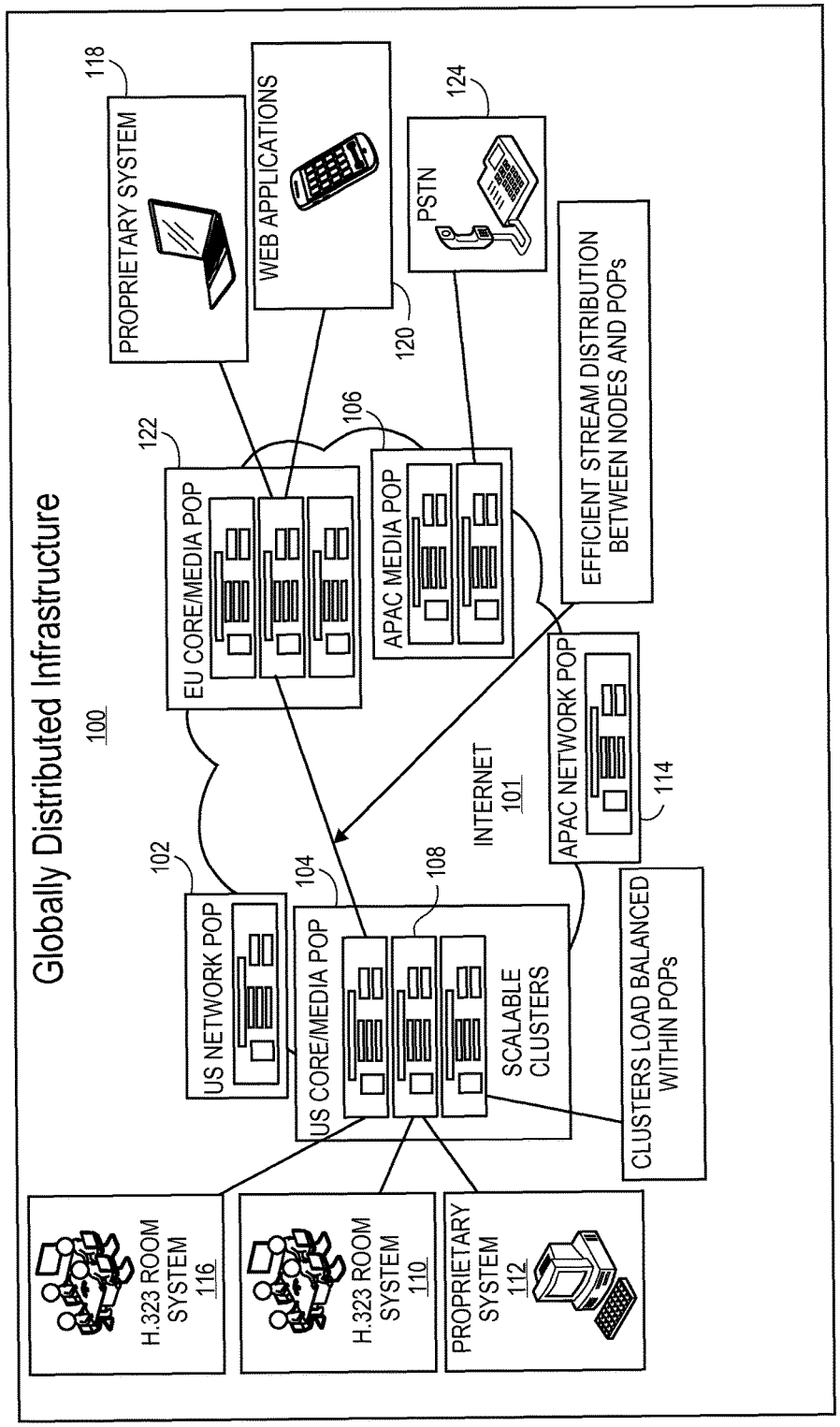
FIG. 1 depicts an exemplary system in accordance with some embodiments of the invention.

Embodiments of apparatuses, computer systems, computer readable mediums, and methods for a user interface of a video conference system are described. A user interface control is provided for a user to select to adjust a size of a user interface element presenting audio and/or visual content (e.g., audio and/or video data streams). Information on the area or "real estate" available on a display of a device may be may be used to intelligently determine a layout for a plurality of user interface elements displayed within a user interface. Numerical representations, such as aspect ratios, for dimensions of potential layouts of user interface elements may be compared and used to intelligently adjust the layout (e.g., sizing and arrangement) of one or more user interface elements displayed. The video quality may be adjusted for one or more user interface elements and the amount of bandwidth apportioned for each of one or more audio video stream may also be adjusted in accordance with the new layout.

In an embodiment, a sliding mechanism (e.g., a sliding user interface control) which represents a physical scale for one or more user interface elements may be selected by the user and the user may interact with the user interface control to request adjustment of a size of the user interface element. The system of the present invention interprets the physical scale intelligently so that the displayed screens are sized up and down and rearranged intelligently to provide maximum usage of display real estate. The present invention can be utilized with any number of streams. With the present invention, the number of pixels displayed is maximized and is reactive to customer input. It is dynamic.

In some embodiments, the video conference system intelligently calculates, uses heuristics, and/or a rule engine to decide how to display the best layout given all the data streams that may be in a layout and how much screen "real estate" is available.

In some embodiments, the video conference system may eliminate streams that are determined to be of less importance or value to one or more users, when only a small amount of screen real estate is available. For example, this can enable the video conference to be displayed in minified form in a web widget on an existing web page and then be popped out of the page and displayed in large form for better visual interaction. In some embodiments, the video conference system may automatically determine the best layout so, that a user does not need to unnecessarily be adjusting layouts manually.

An object of the present invention is to provide a system and services for video conferencing that provides an improved method of displaying audio and visual streams. Another object of the present invention is to provide a system and services for video conferencing that provides a customer with an easier way of interacting with displayed audio and visual streams.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011 (issued as U.S. Pat. No. 9,035,997 on May 19, 2015), U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013 (issued as U.S. Pat. No. 9,232,191 on Jan. 5, 2016), U.S. patent application Ser. No. 13/105,704, entitled "Systems and Methods for Security and Privacy Controls for Videoconferencing," filed on May 11, 2011 (issued as U.S. Pat. No. 9,041,765 on May 26, 2015), U.S. patent application Ser. No. 13/105,716, entitled "Systems and Methods for Shared Multimedia Experiences in Virtual Videoconference Rooms," filed on May 11, 2011 (issued as U.S. Pat. No. 8,875,031 on Oct. 28, 2014), U.S. patent application Ser. No. 13/105,719, entitled "Systems and Methods for Novel Interactions with Participants in Videoconference Meetings," filed on May 11, 2011 (issued as U.S. Pat. No. 8,885,013 on Nov. 11, 2014), U.S. patent application Ser. No. 13/105,723, entitled "Systems and Methods for Real-time Virtual-reality Immersive Multimedia Communications," filed on May 11, 2011 (issued as U.S. Pat. No. 9,143,729 on Sep. 22, 2015), and U.S. patent application Ser. No. 13/251,913, entitled "Systems and Methods for Error Resilient Scheme for Low Latency H.264 Video Coding," filed on Oct. 3, 2011 (issued as U.S. Pat. No. 9,124,757 on Sep. 1, 2015), each incorporated herein by reference in its respective entirety.

The video conference system is described in more detail with reference to FIGS. 1 and 2, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services that may be used in some embodiments are provided in U.S. patent application Ser. No. 13/105,684, entitled "Systems and Methods for Real-Time Multimedia Communication across multiple standards and proprietary devices," filed on May 11, 2011 (issued as U.S. Pat. No. 9,035,997 on May 19, 2015), and U.S. patent application Ser. No. 14/217,275, entitled "Method and Systems for Interfacing Heterogeneous Endpoints and Web-based Media Sources in a Video Conference," filed on Mar. 17, 2014, each incorporated herein by reference in its entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

FIG. 1 depicts an exemplary system, in accordance with some embodiments of the invention. As shown in FIG. 1, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 1, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 1, the globally distributed infrastructure 100 that supports and enables the operations of the video conference has at least one or more of the following attributes:

(1) Ability to support wide variety of audio video formats and protocols;
(2) Scalable mixing and composition of the audio and video streams;
(3) Service delivered across the globe with minimized latency; and
(4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 1 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 2) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 1 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
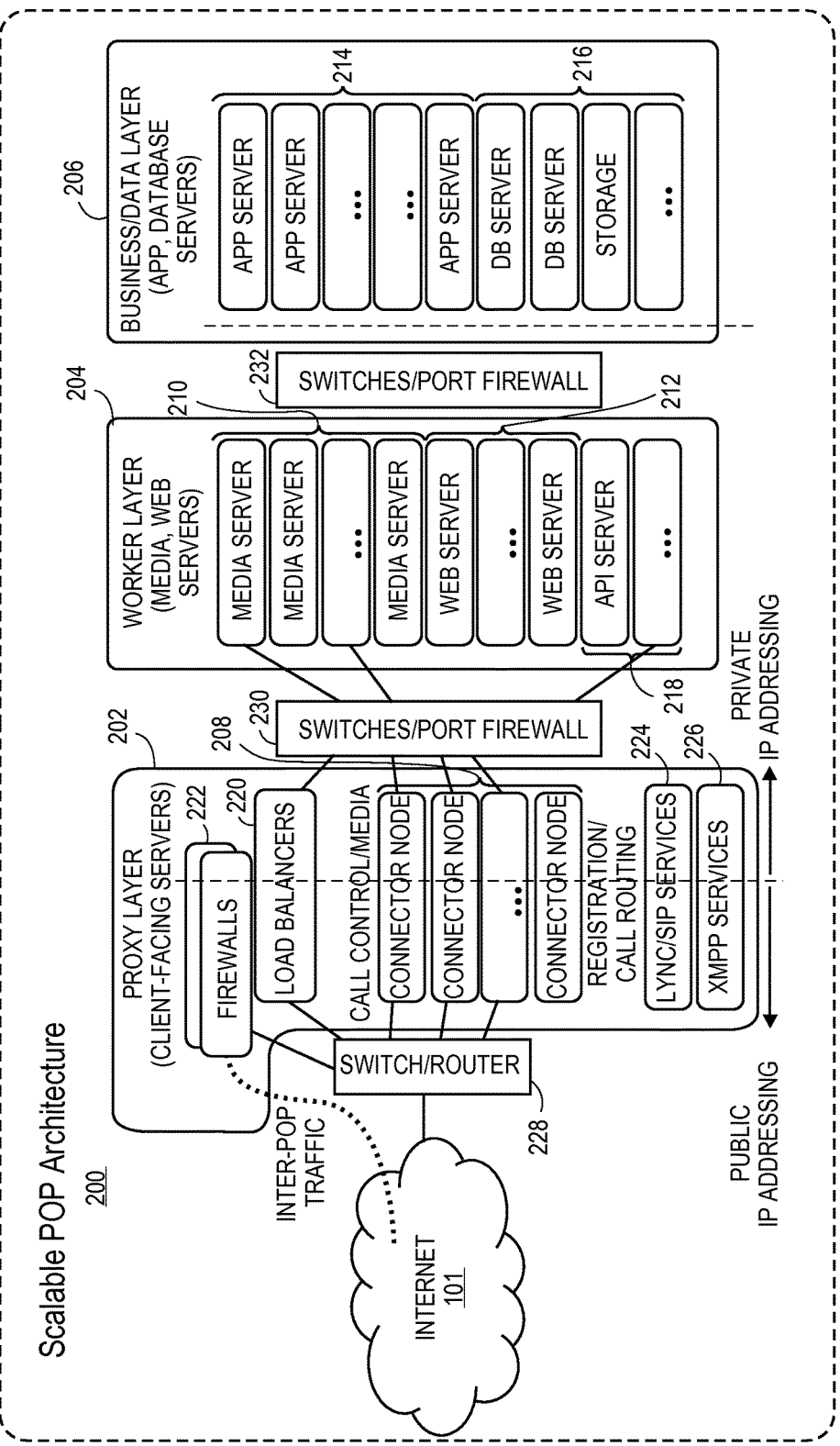
FIG. 2 depicts an exemplary system in accordance with some embodiments of the invention.

FIG. 2 depicts an exemplary system in accordance with some embodiments of the invention. FIG. 2 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks of protocol connectors 208 and/or media servers 210, such as processing of protocol control messages and compressing audio and video streams, may be isolated in one or more separate, independent, and/or unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.

(2) Sharing content with subsets of participants during the course of a call.

(3) Prescribing a standard layout of the screen of his/her video conference point and a set of displayed callers for other participants to see.

(4) Choosing to display caller-specific metadata on the respective video windows of a subset of the participants, including user-name, site name, and any other metadata.

(5) Easy and seamless way to add or remove participants from the video conference call through a real-time, dynamic web interface.

(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Figure 3:
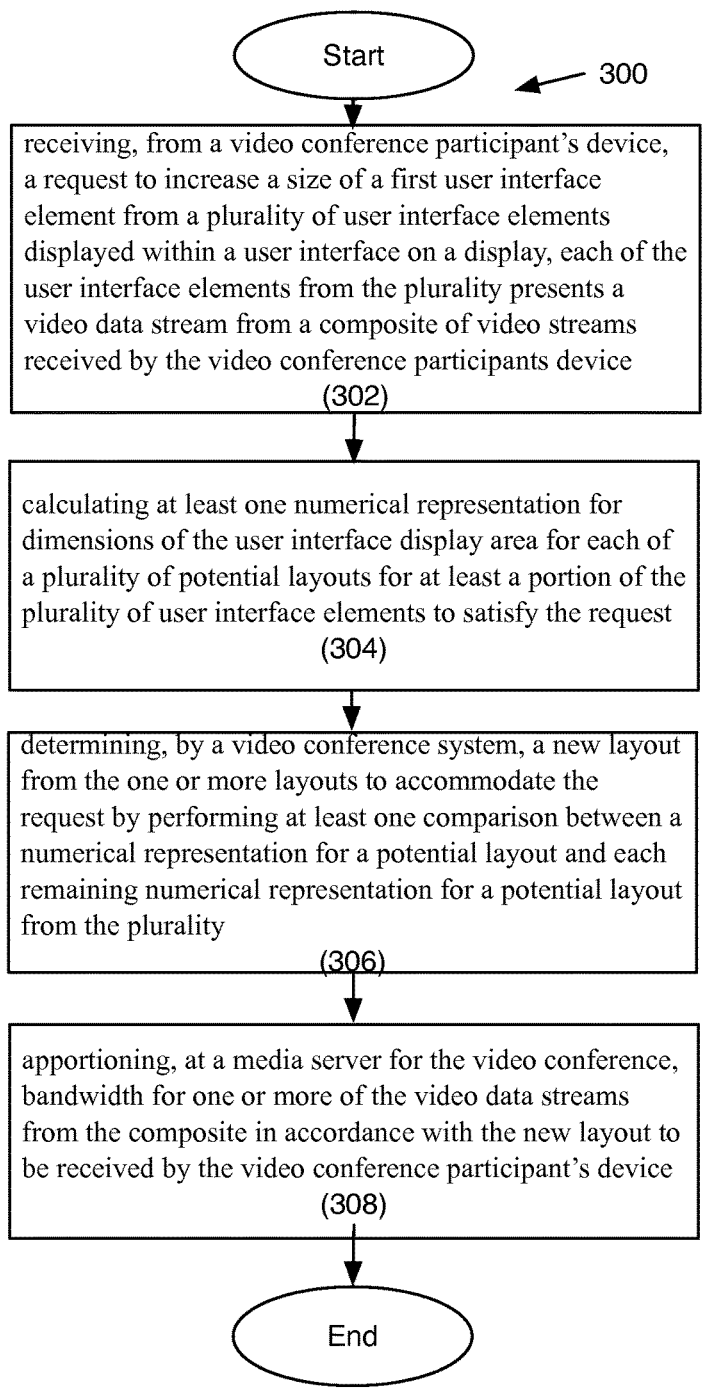
FIG. 3 is a flowchart for an exemplary process in accordance with some embodiments of the invention.

FIG. 3 is a flowchart 300 for an exemplary process in accordance with some embodiments of the invention. A request may be received from a video conference participant's device to increase a size of a first user interface element from a plurality of user interface elements displayed within a user interface on a display (302). A user may request to adjust a size of at least a first user interface element from a plurality of user interface elements displayed within a user interface of a web application at the video conference participant's device and the request may be sent and handled by the video conferencing system (e.g., a media server, an application server, etc.). The participant user may interact with the user interface of the web application to request adjustment of a size of a first user interface element by selecting and interacting with a user interface control on the interface. For example, the request may be detected upon movement of a cursor or other user interface indicator element onto the user interface control, selection of the control, and moving the user interface control with the use of an input device (e.g., a mouse, touch pad, keyboard, motion controller/detector, touch pad, etc.) and/or indicated on a touch screen of a device. By way of example, a slider user interface control may be selected by the user and then the user may interact with the user interface to slide a "button" across a bar to request an increase, a decrease, and/or any other adjustment to one or more user interface element sizes. Continuing with the example, the slider user interface control may provide a way for a user to select the relative heights and/or widths of the user interface elements.

The user interface elements may be resized and rearranged within the user interface to provide the user with a preview of the potential scale and size (e.g., area) the elements may occupy with their request. In some embodiments, "snap points" may be defined for setting sizes that are permitted for the user interface. For example, a slider moved to the right to a point that is eighty percent of the length of the slider bar by the user and the video conferencing system may move and/or "snap" the button to a position at eighty five percent of the length and lock it there until the user moves away from the eighty five percent point (e.g., to the left to a seventy five percent point or further to the right to a ninety percent point).

Each of the user interface elements from the plurality may present a video data stream from a composite of video streams received by one or more video conference participant's devices (302). The user interface elements may be hypertext markup language (HTML) elements that allow for presenting visual and/or audio data streams. By way of example, the elements may be object markup elements, HTML5 video elements, embedded source elements, and/or any other type of user interface element that may allow for the presentation of video data. The video data may be a video data stream from a composite of video streams for an on-going conference and/or playback of a recorded data stream of a past conference, such as a video data stream of a screen share, a video data stream of a third-party application data, an audio video stream from a video conference participant, and/or any other video and/or audio streams.

The participant user may have selected one or more video streams from an on-going conference and/or playback of a recorded data stream of a past conference for display on their device.

At least one numerical representation for dimensions of the user interface display area may be calculated for each of a plurality of potential layouts for at least a portion of the plurality of user interface elements to satisfy the request (304). A plurality of layouts for arrangement of at least a portion of the plurality of user interface elements may be determined to accommodate the request and a numerical representation for the dimensions of each of the potential layouts may be calculated to compare the potential layouts against each other. In the simplest case, with two user interface elements, the potential layouts may have the user interface elements presented side by side (e.g., next to each other on the same horizontal line) or with a first user interface element either above or below a second user interface element. In some cases, one or more user interface elements may be eliminated from a potential layout to reduce the number of user interface elements displayed within the user interface.

Any number of potential layouts may be considered and compared. In some embodiments, the system may try to accommodate the request by keeping the same relative heights and/or widths of the user interface elements as requested by the user. In other embodiments, the system may increase and/or decrease the heights and the widths of the user interface elements as requested by the user, but ensure that such increases or decreases in size are such that the potential layout is aesthetically pleasing and/or abides by particular rules.

The numerical representation for dimensions of the user interface display area for a potential layout may be an aspect ratio for the combination of user interface elements within the user interface for the arrangement of the potential layout. The aspect ratio is a numerical representation that describes the proportional relationship between the video image width and height. The aspect ratio may be determined for the combination of elements for each potential layout to provide a numerical representation for the area or "real estate" on the user interface that the arrangement for the potential layout would cover. For example, the widths of each of the user interface elements may be combined to calculate an aspect ratio for user interface elements that are positioned in a user interface side by side. In another example, the heights may be combined to calculate the aspect ratio for user interface elements positioned vertically in the user interface (e.g., first user interface element above second user interface element). The aspect ratio may also be calculated to factor in the border and/or space between each element to determine heights and widths for an accurate estimate of the area that the elements make take up on the interface.

In some embodiments, aspect ratios of the data streams received for each user interface element may be expected to vary due to changes in available bandwidth for the participant's device, and such variations in bandwidth anticipated or known to occur with a particular device (e.g., a mobile device) may be used as a factor in determining a potential layout. For example, multiple variations of a layout to accommodate varying bandwidth capabilities may be considered (e.g., smaller elements above and below for a reduced bandwidth and larger elements side by side with a best case bandwidth for a device).

At a conferencing system (e.g., an application server or media server for the video conference), a new layout from the one or more potential layouts to accommodate the request may be determined (306). The new layout may be selected by performing at least one comparison between a numerical representation for a potential layout and each remaining numerical representation for a potential layout from the plurality (306). The new layout may be intelligently determined based upon the dimensions on available real estate for the user interface displayed on the device. For example, the maximum amount of space on a user interface for the one or more user interface elements given the static elements of the user interface (e.g., header and footer) may be calculated and each potential layout may be compared to determine which potential layout uses the available space most effectively.

The new layout may alter one or more user interface elements on the user interface by altering a video quality adjustment of one or more user interface elements, a rearrangement of one or more user interface elements into different sizes and positions, and/or an elimination of a user interface element from the user interface. The video quality of an element may be adjusted relative to the increase/decrease in size (e.g., area) of the user interface elements by adjusting the resolution, encoding quality, and/or bandwidth of the video stream.

At a media server for the video conference, bandwidth may be apportioned for one or more of the video data streams from the composite in accordance with the new layout to be received by the video conference participant's device (308). The bandwidth for receipt of the data stream for the first user interface element may also be adjusted with the increase in size of the element within the layout. Upon changing the slider, the system may also adjust bandwidth to match. For example, at 80% slider position, system will reserve 80% of available bandwidth (adjusted continuously and dynamically) for the first user interface element (e.g., a data stream of participant in a conference) and 20% for video of a screen share.

Figure 4:
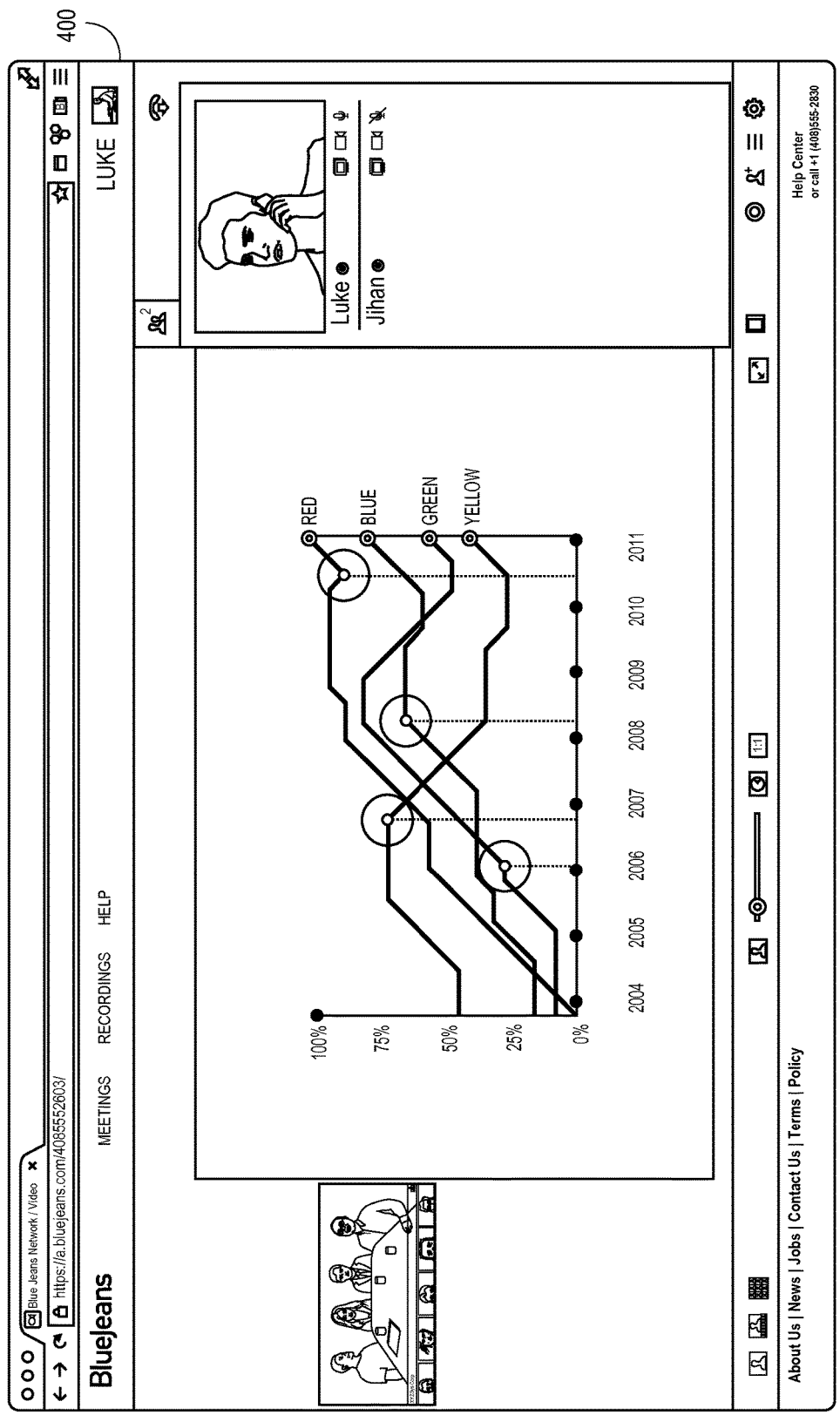
FIG. 4 depicts an exemplary user interface in accordance with some embodiments of the invention.

FIG. 4 is an exemplary user interface in accordance with some embodiments of the invention. As shown in the user interface 400, a user interface control is provided for the user to interact with the system and request adjustment of the size of a user interface element. For example, the user may drag the slider left or right to increase or decrease, respectively, the size of the presentation (and conversely the size of the video). As shown, the user has dragged the slider to the right to increase the size of the presentation. Icons to the left or right of the slider may be shortcuts to display, respectively, all video and no content or all content and no video.

Figure 5:
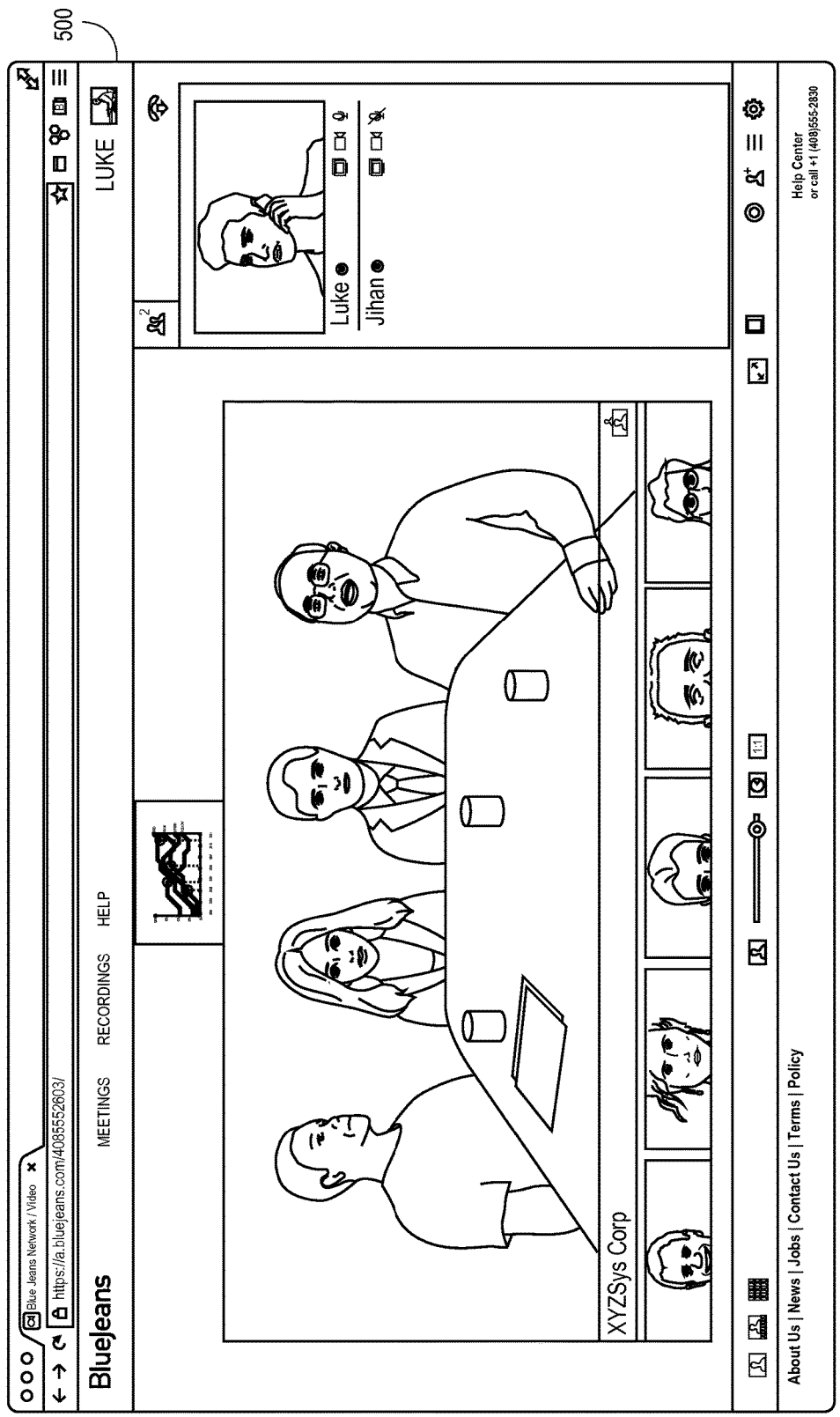
FIG. 5 depicts an exemplary user interface in accordance with some embodiments of the invention in accordance with some embodiments of the invention.

FIG. 5 is an exemplary user interface in accordance with some embodiments of the invention. As shown in the user interface 500, the new layout for the user interface elements has been determined after a user has dragged the slider to the left and increased the size of the video of the on-going conference. As shown in FIG. 4, a side by side layout is used as opposed to the above and below layout in FIG. 5 because the above and below layout was determined as the optimal layouts for the received request and/or respective slider position.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment.

Accordingly, it is the performance of the steps recited in the claims appended below which is pertinent, and not the order of operation of the steps themselves.

Figure 6:
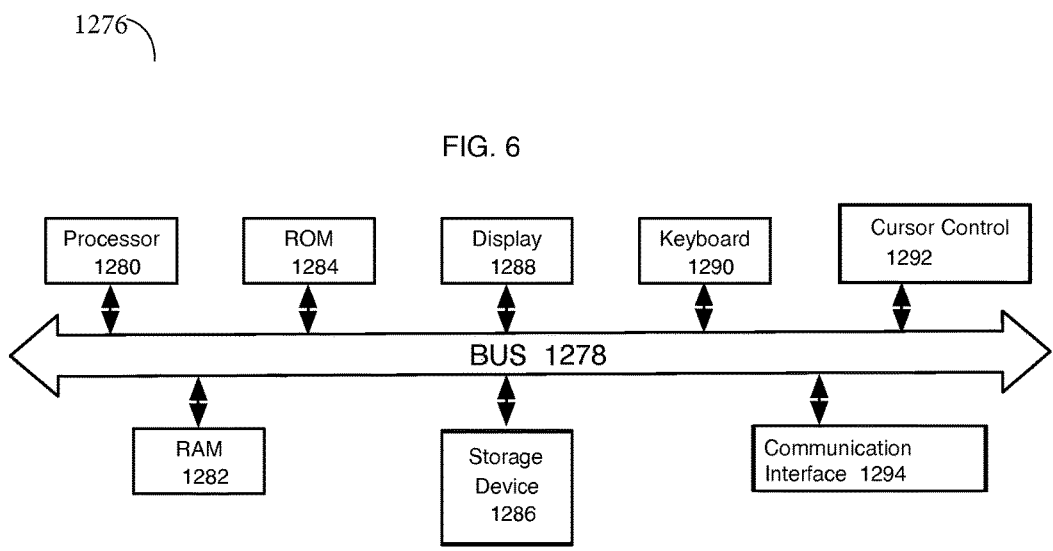
FIG. 6 depicts an exemplary system in accordance with some embodiments of the invention.

Further the procedures described herein may involve the use of various computer systems and computer readable storage media having computer-readable instructions stored thereon. FIG. 6 provides an example of a computer system 1276 that is representative of any of the computer systems or electronic devices discussed herein. Note, not all of the various computer systems may have all of the features of computer system 1276. Computer systems such as computer system 1276 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using a processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention.

The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed:

1. A method, comprising:
   receiving, from a video conference participant's device, a request to increase a size of a first user interface element from a plurality of user interface elements displayed within a user interface on a display of the participant's device, wherein each of the user interface elements presents at least one video stream from a composite of video streams received by the participant's device;
   automatically determining, but not presenting to the participant, a plurality of potential layouts for at least a portion of the user interface elements;

for each of the potential layouts, calculating at least one numerical representation which corresponds to dimensions of a user interface display area occupied by the potential layout;

selecting a layout from the plurality of potential layouts, wherein the selection comprises comparing a numerical representation calculated for a first one of the potential layouts with a numerical representation calculated for a second one of the potential layouts; and apportioning, at a media server, bandwidth for one or more video streams from the composite of video streams in accordance with the selected layout.

2. The method of claim 1, wherein the numerical representation is an aspect ratio of the user interface display area occupied by the potential layout, and the layout is selected to maximize occupancy of the available space on the display of the participant's device.

3. The method of claim 1, further comprising:
increasing an amount of bandwidth allocated for a first video stream presented in the first user interface element in order to increase a video quality in accordance with the selected layout; and
adjusting a size of a second user interface element and an amount of bandwidth allocated for a second video stream presented in the second user interface element.

4. The method of claim 1, further comprising:
selecting a second user interface element from the plurality of user interface elements; and
eliminating the second user interface element from the user interface in order to accommodate an increased size of the first user interface element.

5. The method of claim 1, further comprising:
rearranging the first user interface element and a second user interface element from being displayed in a side by side configuration to a configuration in which the first user interface element is displayed above the second user interface element.

6. The method of claim 4, further comprising:
displaying the second user interface element, which has been eliminated from the user interface, in a pop-up window that is separate from the user interface.

7. The method of claim 1, wherein the at least one video stream comprises at least one of audio video data for a video conference, video data for a whiteboard application, a screen share, audio video data for a recorded video conference, and a chat session.

8. The method of claim 1, further comprising:
detecting a selection of a user interface control element that is located in the user interface, the selection requesting an adjustment of a size of at least the first user interface element relative to a second user interface element; and
allocating bandwidth to the first and the second user interface elements in accordance with their respective relative sizes.

9. A system, comprising:
a processor;
a storage device communicatively coupled to the processor; and
a set of instructions on the storage device that, when executed by the processor, cause the processor to:
receive, from a video conference participant's device, a request to increase a size of a first user interface element from a plurality of user interface elements displayed within a user interface on a display of the participant's device, wherein each of the user interface elements presents at least one video stream from a composite of video streams received by the participant's device;
automatically determine, but not present to the participant, a plurality of potential layouts for at least a portion of the user interface elements;
for each of the potential layouts, calculate at least one numerical representation which corresponds to dimensions of a user interface display area occupied by the potential layout;
select a layout from the plurality of potential layouts, wherein the selection comprises comparing a numerical representation calculated for a first one of the potential layouts with a numerical representation calculated for a second one of the potential layouts; and
apportion bandwidth for one or more video streams from the composite of video streams in accordance with the selected layout.

10. The system of claim 9, further comprising instructions on the storage device that cause the processor to:
increase an amount of bandwidth allocated for a first video stream presented in the first user interface element in order to increase a video quality in accordance with the selected layout; and
adjust a size of a second user interface element and an amount of bandwidth allocated for a second video stream presented in the second user interface element.

11. The system of claim 9, further comprising instructions on the storage device that cause the processor to:
select a second user interface element from the plurality of user interface elements; and
eliminate the second user interface element from the user interface in order to accommodate an increased size of the first user interface element.

12. The system of claim 9, further comprising instructions on the storage device that cause the processor to:
select a layout from the plurality of potential layouts, wherein the selection is further based on predicted variation in bandwidth for the participant's device.

13. The system of claim 11, further comprising instructions on the storage device that cause the processor to:
display the second user interface element, which has been eliminated from the user interface, in a pop-up window that is separate from the user interface.

14. The system of claim 9, further comprising instructions on the storage device that cause the processor to:
detect a selection of a user interface control element that is located in the user interface, the selection requesting an adjustment of a size of at least the first user interface element relative to a second user interface element; and
allocate bandwidth to the first and the second user interface elements in accordance with their respective relative sizes.

15. A non-transitory machine-readable storage medium comprising software instructions that, when executed by a processor, cause the processor to:
receive, from a video conference participant's device, a request to increase a size of a first user interface element from a plurality of user interface elements displayed within a user interface on a display of the participant's device, wherein each of the user interface elements presents at least one video stream from a composite of video streams received by the participant's device;

automatically determine, but not present to the participant, a plurality of potential layouts for at least a portion of the user interface elements;

for each of the potential layouts, calculate at least one numerical representation which corresponds to dimensions of a user interface display area occupied by the potential layout;

select a layout from the plurality of potential layouts, wherein the selection comprises comparing a numerical representation calculated for a first one of the potential layouts with a numerical representation calculated for a second one of the potential layouts; and apportion bandwidth for one or more video streams from the composite of video streams in accordance with the selected layout.

16. The non-transitory machine-readable storage medium of claim 15, further comprising software instructions that cause the processor to:

increase an amount of bandwidth allocated for a first video stream presented in the first user interface element in order to increase a video quality in accordance with the selected layout; and adjust a size of a second user interface element and an amount of bandwidth allocated for a second video stream presented in the second user interface element.

17. The non-transitory machine-readable storage medium of claim 15, further comprising software instructions that cause the processor to:

select a second user interface element from the plurality of user interface elements; and eliminate the second user interface element from the user interface in order to accommodate an increased size of the first user interface element.

18. The non-transitory machine-readable storage medium of claim 15, further comprising software instructions that cause the processor to:

rearrange the first user interface element and a second user interface element from being displayed in a side by side configuration to a configuration in which the first user interface element is displayed above the second user interface element.

19. The non-transitory machine-readable storage medium of claim 17, further comprising software instructions that cause the processor to:

display the second user interface element, which has been eliminated from the user interface, in a pop-up window that is separate from the user interface.

20. The non-transitory machine-readable storage medium of claim 15, further comprising software instructions that cause the processor to:

detect a selection of a user interface control element that is located in the user interface, the selection requesting an adjustment of a size of at least the first user interface element relative to a second user interface element; and allocate bandwidth to the first and the second user interface elements in accordance with their respective relative sizes.

* * * * *